(No Model.)
T. W. ALEXANDER.
PIPE COUPLING.
No. 325,191. Patented Aug. 25, 1885.
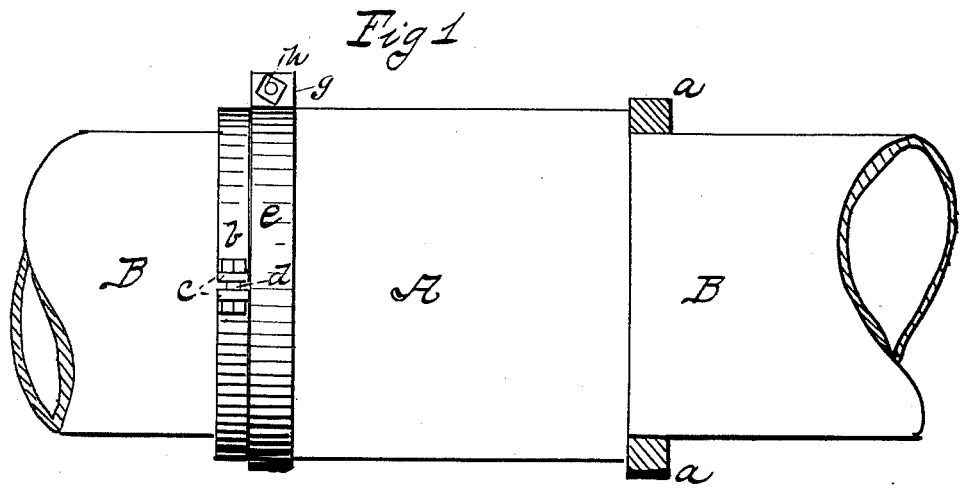
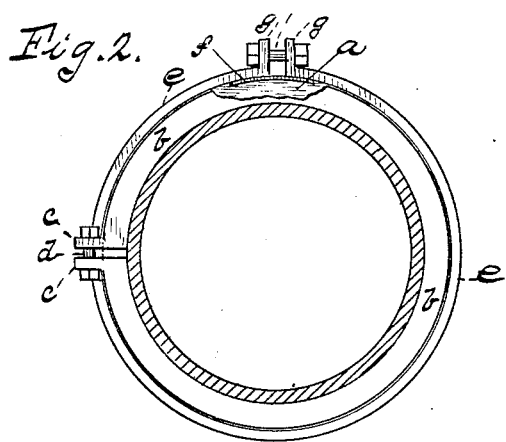
Witnesses:
J. N. McKinney
H. E. Harrison
Inventor:
T. W. Alexander
Per O. D. Levis
Att'y.

UNITED STATES PATENT OFFICE.

THOMAS W. ALEXANDER, OF CHARTIERS TOWNSHIP, ALLEGHENY COUNTY, PENNSYLVANIA.

PIPE-COUPLING.

SPECIFICATION forming part of Letters Patent No. 325,191, dated August 25, 1885.

Application filed May 14, 1885. (No model.)

*To all whom it may concern:*

Be it known that I, THOMAS W. ALEXANDER, of Chartiers township, in the county of Allegheny and State of Pennsylvania, have invented certain new and useful Improvements in Pipe-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in pipe-couplings, the object being to construct a pipe-coupling of simple and durable construction and of small initial cost; and to that end my invention consists in placing a circular rubber band between the ends of an ordinary sleeve-coupling and a circular clamp, then placing a similar clamp of larger diameter about the rubber band and compressing the same.

In the accompanying drawings, Figure 1 is a side elevation of a sleeve-coupling having on one end my improved attachments; at the other end of the coupling I show a rubber band in section. Fig. 2 is an end view of my improved coupling. Fig. 3 is a perspective view of a metallic strip placed between the rubber and its surrounding clamp.

To put my invention into practice with the sleeve-coupling now in common use, I place a rubber band, *a*, close to one end of the sleeve A, which fits neatly about the pipe B, the outside diameter being larger than that of the sleeve B. I then place a clamp, *b*, constructed in one piece, and provided with flanges *c*, through which I place a bolt, *d*, which, when tightened, will contract the inside diameter and secure it to the pipe B.

Around the rubber band *a*, I place a circular clamp, *e*, similar in construction to that before described, but of a larger diameter.

Between the rubber band *a* and the surrounding clamp *e*, I place a short piece, *f*, of sheet metal, of the same width as the clamp *e*. This strip *f* is placed under the opening of the larger clamp, *e*, and serves to confine the rubber band *a*, and allows the angles formed by the flanges *g* to come together without interruption. The other end of the sleeve A is provided with a rubber band, *a*, and clamps *d e*, of the same construction as that before described. The rubber band *a* is compressed by means of the surrounding clamp *e*, and, being confined between the end of the sleeve A and the side of the clamp *b*, will prevent any gas, water, or other liquid from escaping, and will in the course of time become cemented to the several parts.

Heretofore a seal or tight connection has been formed with a rubber ring upon the ends of pipe or tubing especially prepared for the reception of the same by having rings or ridges cast thereupon or formed therewith in other manner, with a clamp surrounding the rubber ring and squeezing it tightly into the creases or openings between the rings or ridges on the pipe. In my invention, however, no such preparation of the pipe or tube is necessary, as ordinary plane-ended pipe, with the usual enlarged sleeve for uniting the two adjacent ends, is used, and a supplemental clamp employed for surrounding the said piece a distance from the end of the sleeve just sufficient to allow the rubber ring to be fitted in. By this means the invention is adapted for use on old pipe, and does not require that the ends of the pipe be especially prepared therefor.

Having thus described my invention, what I claim as new, and desire to secure by Letters Patent, is—

The combination, with the adjacent ends of pipe B B and the sleeve A, which unites the same, of the supplemental clamp or removable ring *b*, placed over and held securely upon the pipe at a suitable distance from the end of the sleeve, the rubber band *a*, inserted between the ring *b* and the end of the sleeve, and the clamp *e*, surrounding the band *a* and compressing it so that it seals the joint between the pipe B and sleeve A, as set forth.

THOMAS W. ALEXANDER.

Witnesses:
    M. E. HARRISON,
    CHAUNCEY B. BOSTWICK.